(12) United States Patent
Wang et al.

(10) Patent No.: US 10,770,978 B2
(45) Date of Patent: Sep. 8, 2020

(54) DC POWER SUPPLY FROM A CONSTANT CURRENT SOURCE

(71) Applicant: Utah State University, Logan, UT (US)

(72) Inventors: Hongjie Wang, Logan, UT (US); Regan A Zane, Hyde Park, UT (US); Tarak Saha, Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 16/363,643

(22) Filed: Mar. 25, 2019

(65) Prior Publication Data
US 2019/0296650 A1    Sep. 26, 2019

Related U.S. Application Data

(60) Provisional application No. 62/647,509, filed on Mar. 23, 2018.

(51) Int. Cl.
| | | |
|---|---|---|
| *H02M 3/335* | (2006.01) | |
| *H02M 1/32* | (2007.01) | |
| *H02M 1/00* | (2006.01) | |

(52) U.S. Cl.
CPC ........... *H02M 3/33569* (2013.01); *H02M 2001/0009* (2013.01); *H02M 2001/0058* (2013.01)

(58) Field of Classification Search
CPC ............ H02M 3/335; H02M 3/33507; H02M 3/33569; H02M 1/32; H02M 1/34; H02M 1/344; H02M 2001/344
See application file for complete search history.

(56) References Cited

U.S. PATENT DOCUMENTS

| | | | | |
|---|---|---|---|---|
| 4,202,023 A | * | 5/1980 | Sears | ........................ H02H 3/06 |
| | | | | 361/18 |
| 2011/0103097 A1 | * | 5/2011 | Wang | ................ H02M 3/33592 |
| | | | | 363/17 |
| 2013/0063981 A1 | * | 3/2013 | Dujic | .................. H02M 1/4233 |
| | | | | 363/16 |

(Continued)

OTHER PUBLICATIONS

Wang et al., "Design considerations for series resonant converters with constant current input," 2016 IEEE Energy Conversion Congress and Exposition (ECCE), Milwaukee, WI, 2016, pp. 1-8.

(Continued)

*Primary Examiner* — Gary L Laxton

(57) ABSTRACT

A power supply includes an active bridge section with input terminals that receive power from a constant current source where the active bridge section operates at a fixed switching frequency. The power supply includes a resonant section with a resonant inductor and a resonant capacitor. The resonant section is connected to an output of the active bridge section. The power supply includes an output rectifier that receives power from the resonant section and includes output terminals for connection to a load and a controller that regulates output current to the load where the controller regulates output current to the load by controlling switching of the active bridge section. The fixed switching frequency of the active bridge section matches a resonant frequency of the resonant section.

17 Claims, 8 Drawing Sheets

(56) References Cited

U.S. PATENT DOCUMENTS

| | | | | |
|---|---|---|---|---|
| 2014/0355313 A1* | 12/2014 | Nishikawa | ............ | H02M 1/081 |
| | | | | 363/17 |
| 2015/0023073 A1* | 1/2015 | Kim | ........................ | H02M 7/12 |
| | | | | 363/52 |
| 2015/0109830 A1* | 4/2015 | Xu | .................... | H02M 3/33569 |
| | | | | 363/21.03 |

OTHER PUBLICATIONS

Wang et al., "Analysis and design of a series resonant converter with constant current input and regulated output current," 2017 IEEE Applied Power Electronics Conference and Exposition (APEC), Tampa, FL, 2017, pp. 1741-1747.

* cited by examiner

DC POWER SUPPLY FROM A CONSTANT CURRENT SOURCE

CROSS-REFERENCES TO RELATED APPLICATIONS

This application claims the benefit of U.S. Provisional Patent Application No. 62/647,509 entitled "DC POWER SUPPLY FROM A CONSTANT CURRENT SOURCE" and filed on Mar. 23, 2018 for Hongjie Wang et al., which is incorporated herein by reference for all purposes.

FIELD

This invention relates to direct current ("DC")-DC power supplies and more particularly relates to a DC-DC power supply fed by a constant current source and regulating output current.

BACKGROUND

Resonant converters are widely applied in various applications such as Uninterrupted Power Systems ("UPSs"), DC distribution systems and wireless power transfer ("WPT") systems for high efficiency and low electromagnetic interference ("EMI"). In a variety of industrial applications, including LED drivers, battery charging and capacitor charging, output current regulated power supplies are often used.

Most of the research in the literature focuses on constant voltage input to resonant converters. However, LCL (inductor-capacitor-inductor) resonant network can be employed in a WPT system to generate a constant current running through the primary track, irresponsive to the change of the load. LCCL (inductor-capacitor-capacitor-inductor) resonant networks can provide a higher maximum track current compared to the LCL topology. The LCL-T resonant converter behaves as a current-source under certain operating condition. However, in some applications, such as underwater telecommunication and undersea observation system, a constant DC current distribution from the shore is preferred over DC voltage distribution for its robustness against cable impedance and faults.

SUMMARY

A power supply includes an active bridge section with input terminals that receive power from a constant current source where the active bridge section operates at a fixed switching frequency. The power supply includes a resonant section with a resonant inductor and a resonant capacitor. The resonant section is connected to an output of the active bridge section. The power supply includes an output rectifier that receives power from the resonant section and comprising output terminals for connection to a load and a controller that regulates output current to the load where the controller regulates output current to the load by controlling switching of the active bridge section. The fixed switching frequency of the active bridge section matches a resonant frequency of the resonant section.

Another embodiment of a power supply includes an active bridge section with input terminals that receive power from a constant current source, a resonant section with a resonant inductor and a resonant capacitor where the resonant section is connected to an output of the active bridge section and an output rectifier that receives power from the resonant section and with output terminals for connection to a load. The power supply includes a controller that regulates output current to the load. The power supply includes a bypass branch connected in parallel with the input terminals where the bypass branch shunts current from the constant current source through the bypass branch when the bypass branch is active, a resonant capacitor voltage clamping circuit that clamps voltage across the resonant capacitor to a voltage less than a maximum voltage rating of the resonant capacitor during a transient condition, and a current limiting circuit connected in series between an output terminal of the output rectifier and the load. The current limiting circuit increases a resistance across the current limiting circuit in response to output current to the load increasing above an output current limit.

A controller of a power supply includes an output current regulation feedback loop that regulates output current of the power supply to a load. The controller regulates output current to the load by controlling switching of an active bridge section of the power supply. The power supply includes a resonant section with a resonant inductor and a resonant capacitor. The resonant section is connected to an output of the active bridge section. The power supply includes the active bridge section with input terminals that receive power from to a constant current source. The active bridge section operates at a fixed switching frequency. The power supply includes an output rectifier that receives power from the resonant section and the output rectifier includes output terminals for connection to the load. The fixed switching frequency of the active bridge section matches a resonant frequency of the resonant section.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
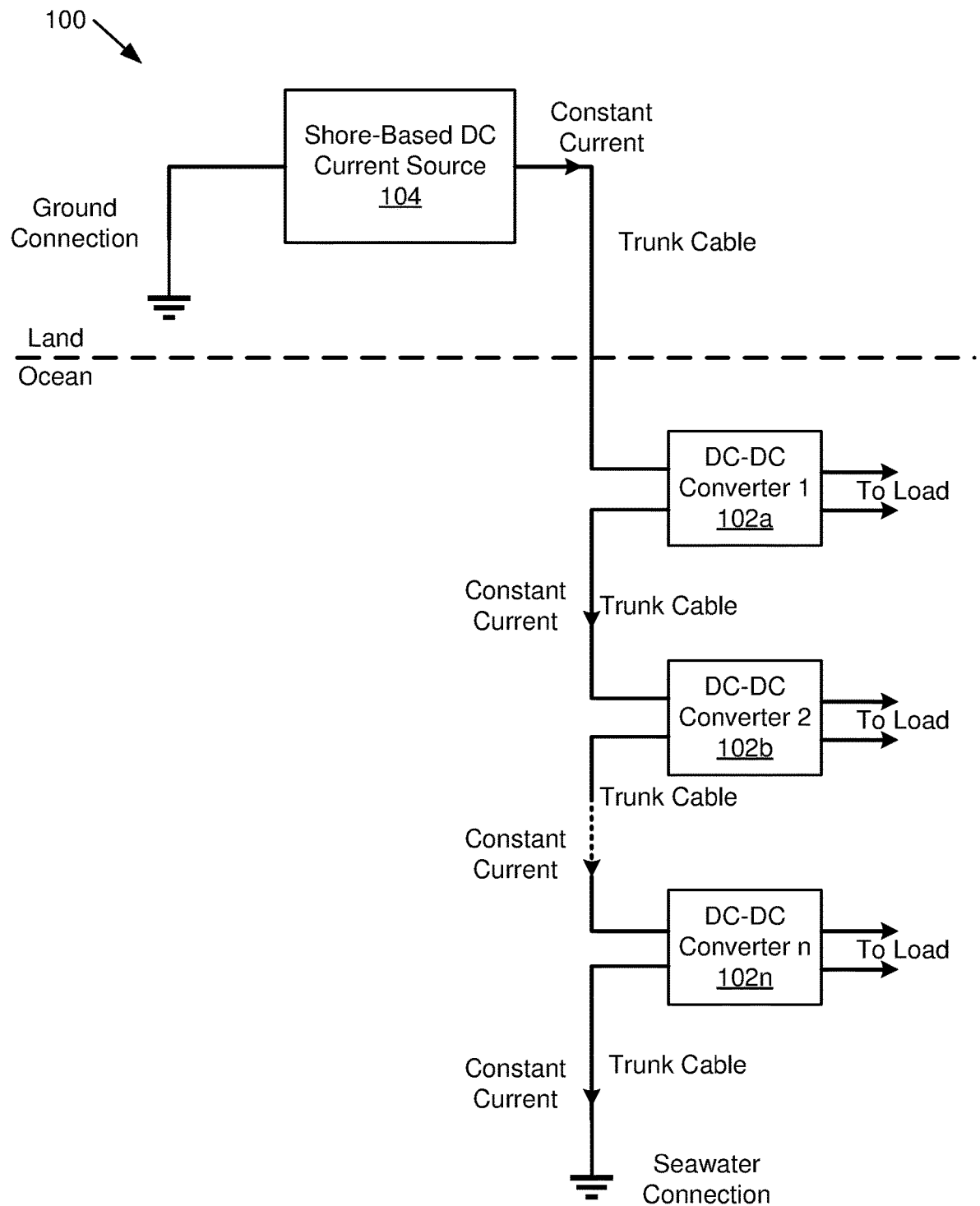
FIG. 1 is a schematic block diagram illustrating one embodiment of a system with DC-DC converters and a constant current source.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A power supply includes an active bridge section with input terminals that receive power from a constant current source where the active bridge section operates at a fixed switching frequency. The power supply includes a resonant section with a resonant inductor and a resonant capacitor. The resonant section is connected to an output of the active bridge section. The power supply includes an output rectifier that receives power from the resonant section and includes output terminals for connection to a load and a controller that regulates output current to the load where the controller regulates output current to the load by controlling switching of the active bridge section. The fixed switching frequency of the active bridge section matches a resonant frequency of the resonant section.

In some embodiments, the controller regulates output current to the load as a function of current gain from the output current to current from the constant current source by controlling switching of the active bridge section as a single control variable over a range from a minimum load condition to a full load condition. In a further embodiment, the active bridge section is a full active bridge, the output rectifier is a diode half-bridge voltage doubler and the power supply includes a transformer between the resonant section and the output rectifier. The controller regulates the current gain as a function of a single control variable of a phase shift angle between switching in a first leg of the active bridge section and a second leg in the active bridge section. In a further embodiment, the controller regulates the current gain according to the equation:

$$M_I = \frac{I_{out}}{I} = \frac{1}{2n\sin\left(\frac{\alpha}{2}\right)}$$

where $M_I$ is the current gain, $I_{out}$ is the output current, I is the current from the constant current source, n is a turns ratio of the transformer and $\alpha$ is the phase shift angle. In another further embodiment, the active bridge section is a half-bridge and the controller regulates the current gain as a function of a single control variable of a duty cycle of switches of the active bridge section.

In some embodiments, the power supply includes a bypass branch connected in parallel with the input terminals, where the bypass branch shunts current from the constant current source through the bypass branch when the bypass branch is active. In other embodiments, the bypass branch includes a sensing resistor in series with a shunt switch that is a transistor. The controller operates the shunt switch in an active region of the transistor to shunt current from the constant current source in a range between zero current and a full current of the constant current source and the shunt switch is operable to shunt a portion of the current of the constant current source.

In some embodiments, the power supply includes a resonant capacitor voltage clamping circuit that clamps voltage across the resonant capacitor to a voltage less than a maximum voltage rating of the resonant capacitor during a transient condition. In other embodiments, the resonant capacitor voltage clamping circuit includes a diode full-bridge rectifier with an input of the diode full-bridge rectifier connected across the resonant capacitor and an output of the diode full-bridge rectifier connected in parallel with a clamping capacitor and connected in parallel with a bleeder resistor. During steady-state operation, voltage across the clamping capacitor is higher than a voltage rating of the resonant capacitor.

In some embodiments, the power supply includes a current limiting circuit connected in series between an output terminal of the output rectifier and the load where the current limiting circuit increases a resistance across the current limiting circuit in response to output current to the load increasing above an output current limit. In other embodiments, the current limiting circuit includes a current limiting switch in series with a sensing resistor. The current limiting switch is a transistor and voltage across the sensing resistor is connected to a control terminal of the transistor and a voltage level across the sensing resistor activates an active region of the transistor and a current increase in the sensing resistor increases a resistance across the transistor.

Another embodiment of a power supply includes an active bridge section with input terminals that receive power from a constant current source, a resonant section with a resonant inductor and a resonant capacitor where the resonant section is connected to an output of the active bridge section and an output rectifier that receives power from the resonant section and comprising output terminals for connection to a load. The power supply includes a controller that regulates output current to the load. The power supply includes a bypass branch connected in parallel with the input terminals where the bypass branch shunts current from the constant current source through the bypass branch when the bypass branch is active, a resonant capacitor voltage clamping circuit that clamps voltage across the resonant capacitor to a voltage less than a maximum voltage rating of the resonant capacitor during a transient condition, and a current limiting circuit connected in series between an output terminal of the output rectifier and the load. The current limiting circuit increases a resistance across the current limiting circuit in response to output current to the load increasing above an output current limit.

In some embodiments, the active bridge section operates at a fixed switching frequency and the controller regulates output current to the load by controlling switching of the active bridge section. The fixed switching frequency of the active bridge section matches a resonant frequency of the resonant section. In another embodiment, the controller regulates output current to the load as a function of current gain from the output current to current from the constant current source by controlling switching of the active bridge section as a single control variable over a range from a minimum load condition to a full load condition. In other embodiments, the active bridge section is a full active bridge, the output rectifier is a diode half-bridge voltage doubler and the power supply includes a transformer between the resonant section and the output rectifier. The controller regulates the current gain as a function of a single control variable of a phase shift angle between switching in a first leg of the active bridge section and a second leg in the active bridge section.

In some embodiments, the bypass branch includes a sensing resistor in series with a shunt switch that is a transistor and the controller operates the shunt switch in an active region of the transistor to shunt current from the constant current source in a range between zero current and a full current of the constant current source. The shunt switch is operable to shunt a portion of the current of the constant current source. In other embodiments, the resonant capacitor voltage clamping circuit includes a diode full-bridge rectifier with an input of the diode full-bridge rectifier connected across the resonant capacitor and an output of the diode full-bridge rectifier connected in parallel with a clamping capacitor and connected in parallel with a bleeder resistor. During steady-state operation voltage across the clamping capacitor is higher than a voltage rating of the resonant capacitor. In other embodiments, the current limiting circuit includes a current limiting switch in series with a sensing resistor, where the current limiting switch is a transistor. Voltage across the sensing resistor is connected to a control terminal of the transistor and a voltage level across the sensing resistor activates an active region of the transistor and a current increase in the sensing resistor increases a resistance across the transistor.

A controller of a power supply includes an output current regulation feedback loop that regulates output current of the power supply to a load. The controller regulates output current to the load by controlling switching of an active bridge section of the power supply. The power supply includes a resonant section with a resonant inductor and a resonant capacitor. The resonant section is connected to an output of the active bridge section. The power supply includes the active bridge section with input terminals that receive power from to a constant current source. The active bridge section operates at a fixed switching frequency. The power supply includes an output rectifier that receives power from the resonant section and the output rectifier includes output terminals for connection to the load. The fixed switching frequency of the active bridge section matches a resonant frequency of the resonant section.

In some embodiments, the power supply includes a bypass branch connected in parallel with the input terminals where the bypass branch shunts current from the constant current source through the bypass branch when the bypass branch is active. In other embodiments, the power supply includes a resonant capacitor voltage clamping circuit that clamps voltage across the resonant capacitor to a voltage less than a maximum voltage rating of the resonant capacitor during a transient condition, and a current limiting circuit connected in series between an output terminal of the output rectifier and the load. The current limiting circuit increases a resistance across the current limiting circuit in response to output current to the load increasing above an output current limit. The controller regulates output current to the load as a function of current gain from the output current to current from the constant current source by controlling switching of the active bridge section as a single control variable over a range from a minimum load condition to a full load condition.

FIG. 1 is a schematic block diagram illustrating one embodiment of a system 100 with DC-DC converters 102a-n (collectively or generically "102") a constant current source 104. In the embodiment, the constant current source 104 is direct current ("DC") and is on a shore of an ocean or other body of salty or otherwise conductive water and a trunk cable feeds DC-DC converters 102, which are series connected. Each DC-DC converter 102 feeds a load, such as a sensor, a light, a vehicle, a camera, and the like.

The constant current source 104 is grounded on land and the trunk cable is grounded by a seawater connection. An advantage of a system 100 with a constant current source 104 feeding converters 102 is robustness against voltage drop over a long distance of the trunk cable. In addition, the system 100 includes robustness against cable faults where seawater serves as the current return. Each DC-DC converter 102 has a constant input current with a regulated output current. Other systems in other situations also benefit from a constant current source feeding one or more DC-DC converters 102.

In some embodiments, the converters 102 are series resonant converters or a similar topology and include an active bridge section with input terminals that receive power from a constant current source. In some embodiments, the active bridge section operates at a fixed switching frequency. The series resonant converter includes resonant section with a resonant inductor and a resonant capacitor where the resonant section is connected to an output of the active bridge section, and an output rectifier that receives power from the resonant section and includes output terminals for connection to a load. The series resonant converter includes, in some embodiments, a controller that regulates output current to the load. The controller regulates output current to the load by controlling switching of the active bridge section. In some embodiments, the fixed switching frequency of the active bridge section matches a resonant frequency of the resonant section.

Feeding the DC-DC converters 102 (or converters 102) with a constant current source creates challenges during startup and shutdown of the converters 102. In addition, failures, transients, etc. may also cause problems for the converters 102. For example, if switches of the converters 102 stop operating, input voltage across an input capacitor could rise dramatically. Other concerns with the converters 102 are also discussed below along with protection features.

Figure 2:
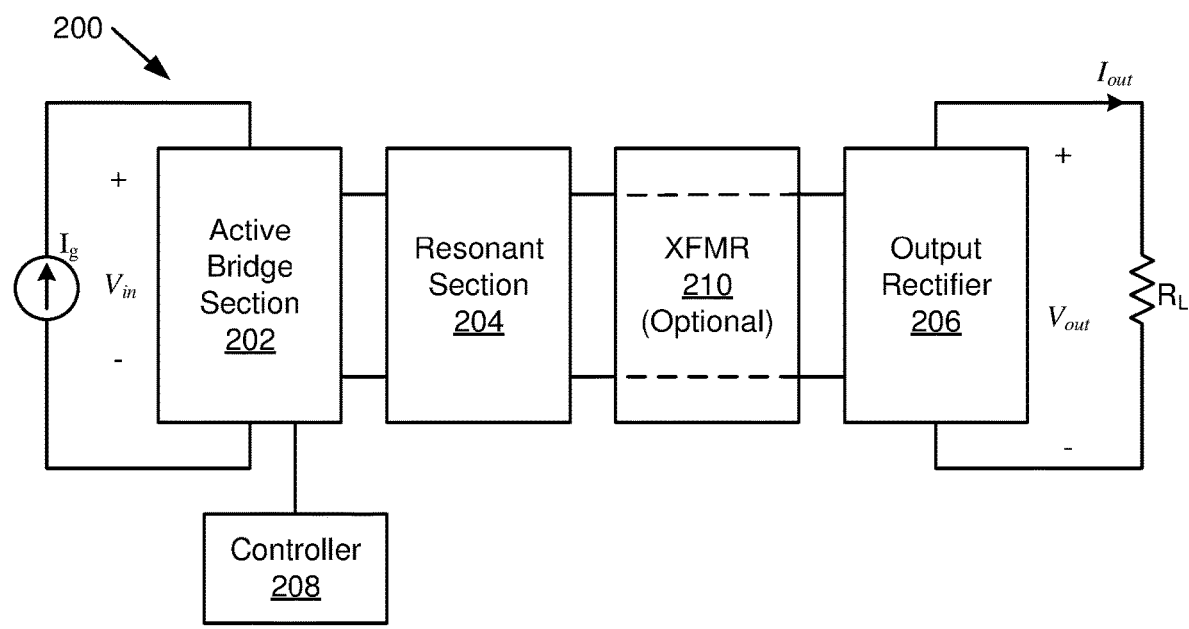
FIG. 2 is a schematic block diagram illustrating one embodiment of a power supply that regulates output current and is fed by a constant current source.

FIG. 2 is a schematic block diagram illustrating one embodiment of a power supply 200 with that regulates output current and is fed by a constant current source $I_g$. The SRC 200 includes an active bridge section 202 with input terminals that receive power from the constant current source $I_g$ where the active bridge section 202 operates at a fixed switching frequency $f_s$. In one example, the active bridge section 202 includes a full active bridge with a first switching leg with two switches $Q_1$ and $Q_2$ and a second switching leg with two additional switches $Q_3$ and $Q_4$ where the resonant section 204 connects to a connection point A between switches $Q_1$ and $Q_2$ of the first leg and connects to a connection point B between switches $Q_3$ and $Q_4$ of the second leg. In another example, the active bridge section 202 is a half-bridge with a single switching leg with two switches $Q_1$ and $Q_2$. In other embodiments, the active bridge section 202 includes another active bridge topology.

The power supply 200 includes a resonant section 204 with a resonant inductor $L_r$ and a resonant capacitor $C_c$. The resonant section 204 is connected to an output of the active bridge section 202. The power supply 202 includes an output rectifier 206 that receives power from the resonant section 204 and includes output terminals for connection to a load $R_L$. In some embodiments, the output rectifier 206 is a diode half-bridge voltage doubler. In other embodiments, the output rectifier 206 is a diode half-bridge rectifier. In other embodiments, the output rectifier 206 is a diode full-bridge rectifier. In other embodiments, the output rectifier 206 includes an active rectifier topology with active switches. One of skill in the art will recognize other rectifier topologies for the output rectifier 206.

The power supply 200 includes a controller 208 that regulates output current to the load $R_L$ where the controller 208 regulates output current to the load by controlling switching of the active bridge section 202. By regulating output current, the power supply 200 provides constant output current to the load $R_L$. The fixed switching frequency $f_s$ of the active bridge section 202 matches a resonant frequency $f_o$ of the resonant section 204, which provides a mechanism for simplified control.

In some embodiments, the power supply includes a transformer 210 between the resonant section 204 and the output rectifier 206 with a turns ratio of 1:n. Selection of the transformer turns ratio is useful in managing a current gain $M_I$ of the power supply 200 and, in some embodiments, provides isolation between the input and the output of the power supply 200.

Figure 3A:
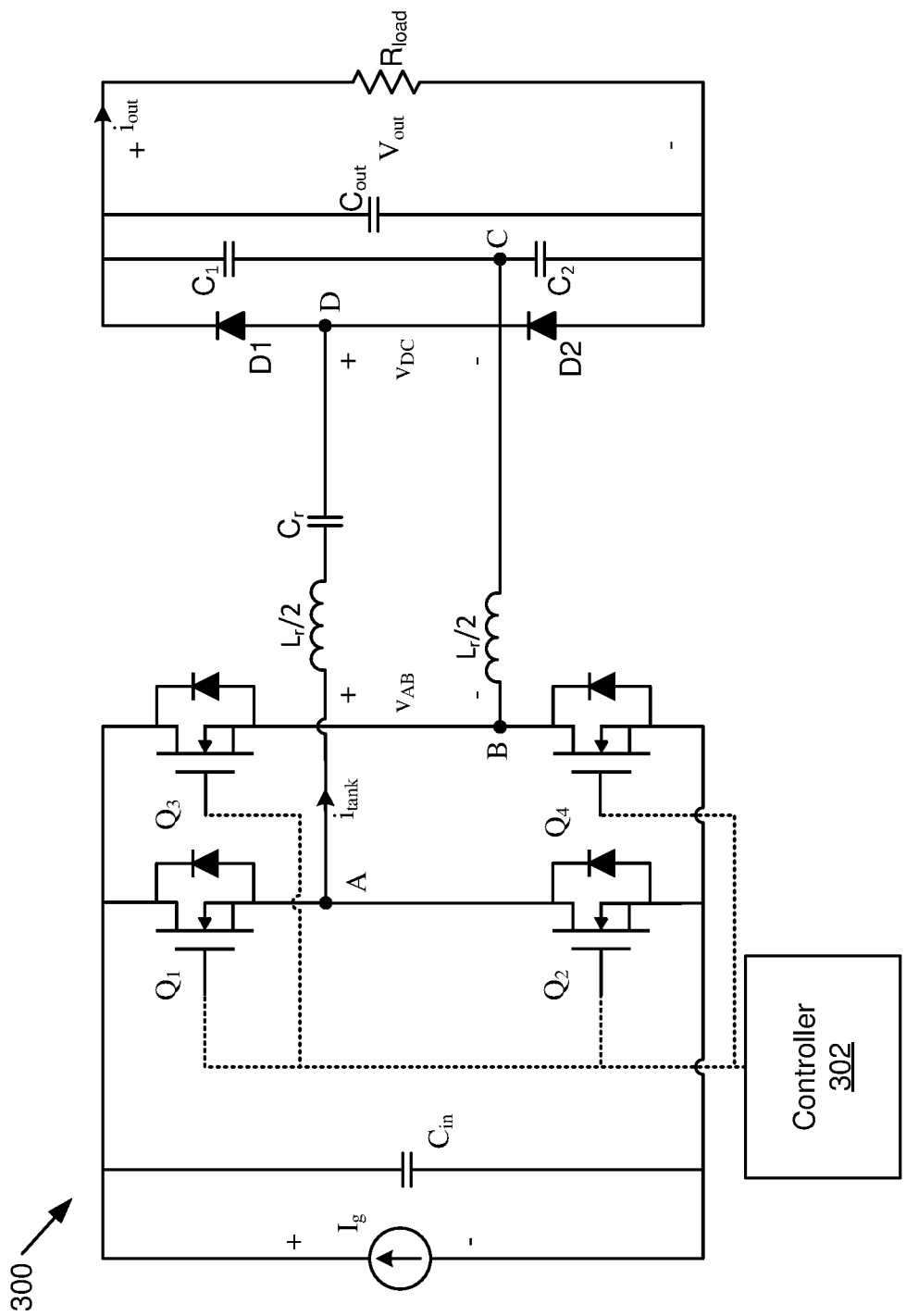
FIG. 3A is a schematic block diagram illustrating one embodiment of a series resonant converter ("SRC") with a full-bridge switching section that regulates output current and is fed by a constant current source.

FIG. 3A is a schematic block diagram illustrating one embodiment of a series resonant converter ("SRC") 300 with a full-bridge switching section that regulates output current and is fed by a constant current source $I_g$. In the embodiment, the active bridge section 202 described above is a full-bridge switching section that includes four switches Q1-Q4. In some embodiments, each switch Q1-Q4 is metal-oxide semiconductor field-effect transistor ("MOSFET"). In other embodiments, the switches Q1-Q4 are other types of semiconductor switches or other types of switches capable of operating at the chosen switching frequency. The full-bridge switching section is in an H-bridge configuration with two switches Q1, Q2 in a first switching leg and two switches Q3, Q4 in a second switching leg. In some embodiments, the SRC 300 may also include an input capacitor $C_{in}$ that helps to smooth voltage ripple on the input voltage $V_{in}$ caused by switching of the switches Q1-Q4 of the full-bridge switching section.

The SRC 300 includes a resonant section 204 with a resonant inductor $L_r$ and a resonant capacitor $C_r$ where the resonant section 204 is connected to an output of the active bridge section 202 at connection point A located between the switches Q1, Q2 of the first switching leg and connection point B located between the switches Q3, Q4 of the second switching leg. In the embodiment, the resonant inductor $L_r$ is split into two parts, but may be a single inductor. The SRC 300 also includes an output rectifier 206 that receives power from the resonant section 204 and includes output terminals for connection to a load $R_{load}$. In the depicted embodiment, the output rectifier 206 is a diode half-bridge voltage doubler that includes a first diode $D_1$, and a second diode $D_2$, a first capacitor $C_1$ and a second capacitor $C_2$ as depicted in FIG. 3A. Typically, the output rectifier 206 also includes an output capacitor $C_{out}$ that helps to smooth voltage ripple of the output voltage $V_{out}$.

In some embodiments, the SRC 300 includes a controller 302 that regulates output current $I_{out}$ to the load $R_{load}$, where the controller 302 regulates output current $I_{out}$ to the load $R_{load}$ by controlling switching of the switches Q1-Q4 of the active bridge section 202 by way of controlling a phase shift angle α, as explained below. In some embodiments, where the switching frequency of the active bridge section 202 is fixed, the fixed switching frequency $f_s$ matches a resonant frequency $f_o$ of the resonant section 204, which provides benefits that are described below.

Figure 3B:
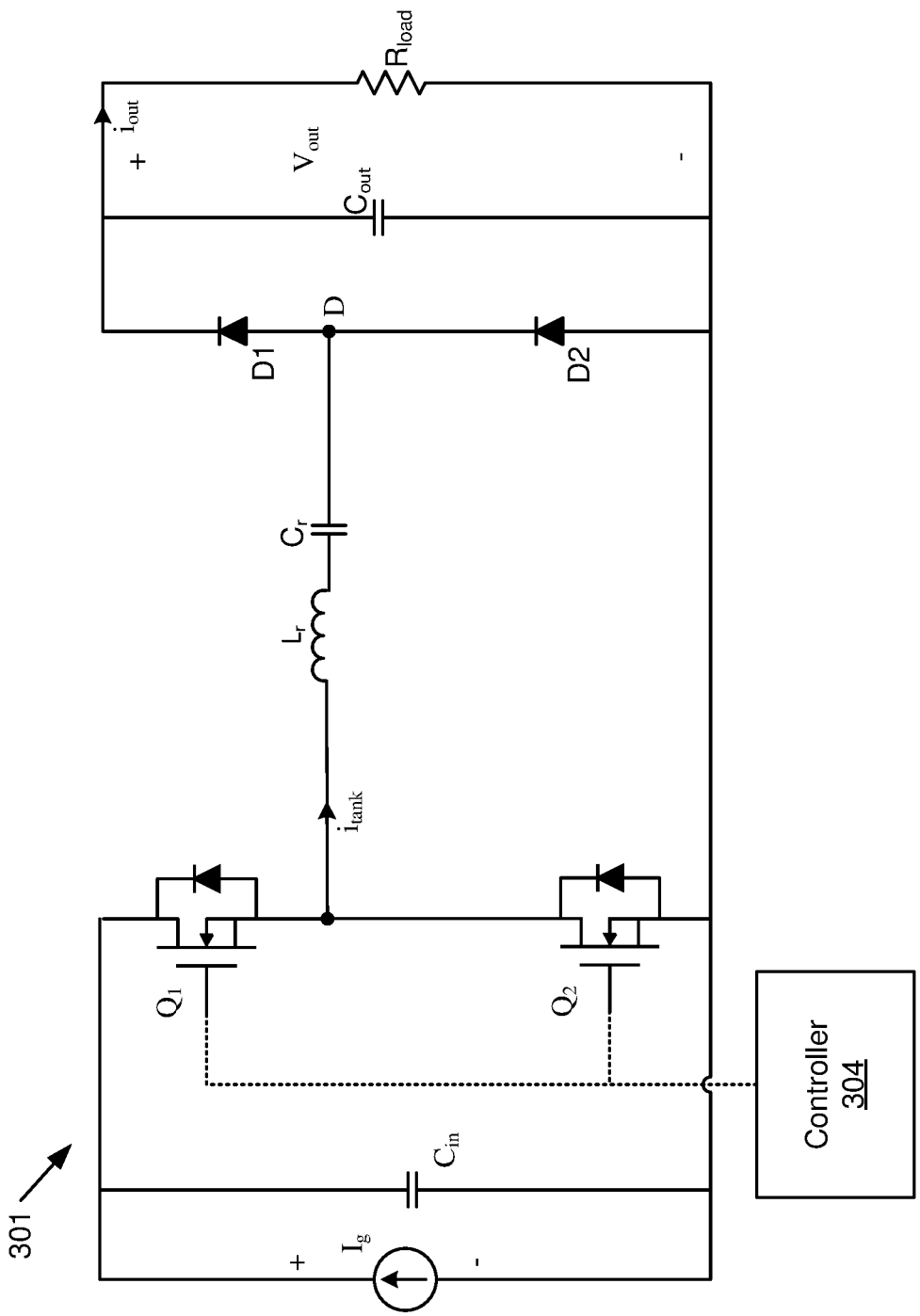
FIG. 3B is a schematic block diagram illustrating one embodiment of a SRC with a half-bridge switching section and that regulates output current and is fed by a constant current source.

FIG. 3B is a schematic block diagram illustrating one embodiment of a SRC 301 with a half-bridge switching section and that regulates output current $I_{out}$ and is fed by a constant current source $I_g$. The SRC 301 includes an active bridge section 202 that is a half-bridge switching section with two switches Q1, Q2 in a single switching leg and includes input terminals that receive power from the constant current source $I_g$. The resonant section 204 also includes a resonant inductor $L_r$ and a resonant capacitor $C_r$ connected to the active bridge section 202. The output rectifier 206 also includes two diodes $D_1$ and $D_2$ in a different configuration than the SRC 300 of FIG. 3A. In some embodiments, the switching frequency of the half-bridge switching section is fixed and the SRC 301 includes a controller 304 that regulates output current $I_{out}$ to the load $R_{load}$, where the controller 304 regulates output current $I_{out}$ to the load $R_{load}$ by controlling switching of the active bridge section 202 in the form of controlling a duty cycle of the switches Q1, Q2. In some embodiments, the active bridge section 202 includes a half-bridge as depicted in FIG. 3B and the controller 304 regulates the current gain as a function of a single control variable of a duty cycle of switches Q1, Q2 of the active bridge section 202.

Figure 4:
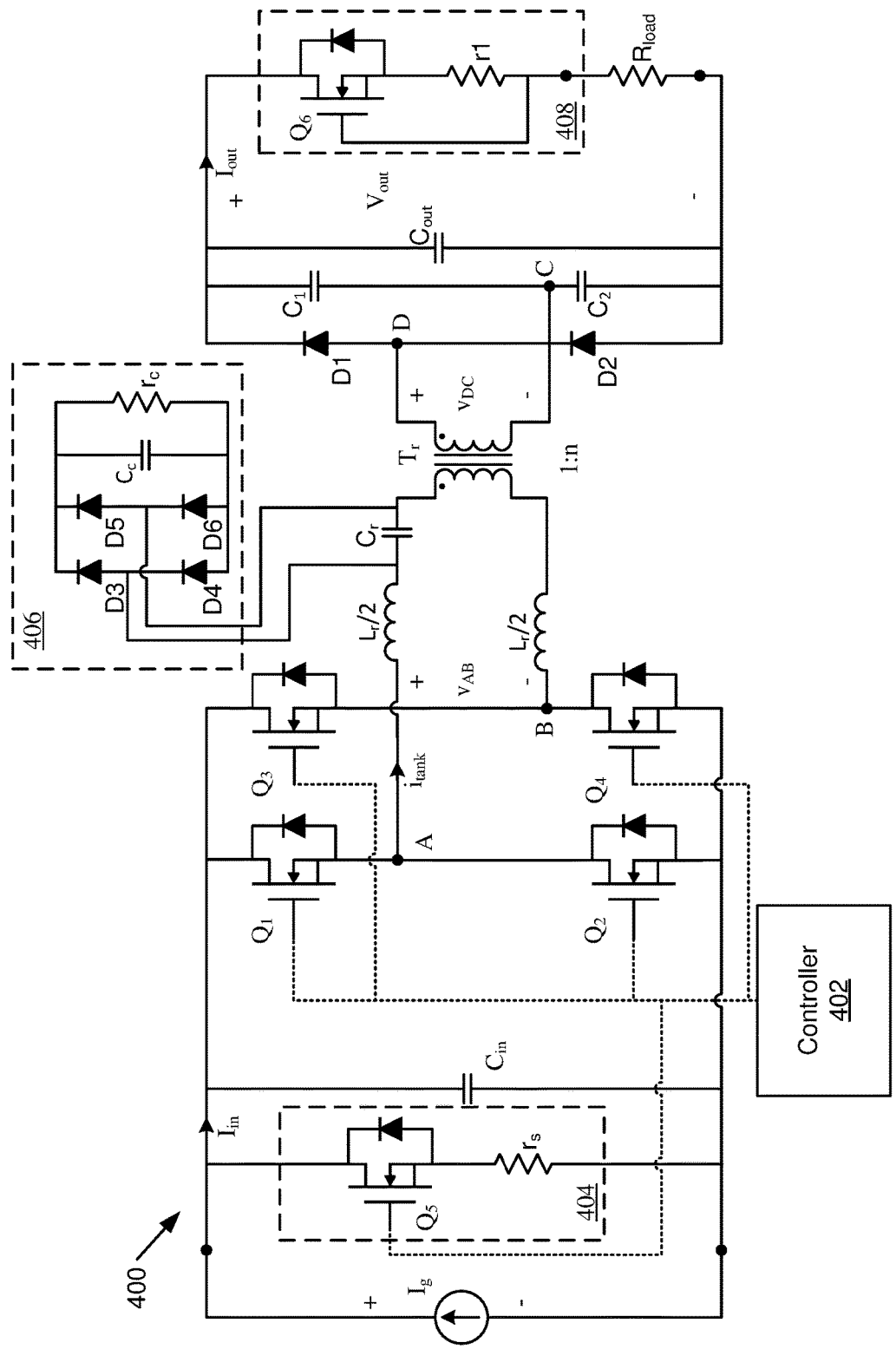
FIG. 4 is a schematic block diagram illustrating one embodiment of a SRC with a full-bridge switching section and that regulates output current and is fed by a constant current source and includes protection features.

FIG. 4 is a schematic block diagram illustrating one embodiment of a SRC 400 with a full-bridge switching section and that regulates output current $I_{out}$ and is fed by a constant current source $I_g$ and includes protection features. In the embodiment, the SRC 400 is substantially similar to the SRC 300 of FIG. 3A, but includes a transformer $T_r$ (e.g. transformer 210) that has a turns ratio of 1:n turns, along with protection features, which will be described below. The transformer $T_r$, in some embodiments, provides isolation and a transformation of voltage and current that are useful in achieving a desired current gain. In some embodiments, the active bridge section 202 includes a full active bridge, the output rectifier 206 includes a diode half-bridge voltage doubler, as depicted in FIG. 4, and the SRC 400 includes a transformer $T_r$ between the resonant section 204 and the output rectifier 206. The controller 402 regulates the current gain as a function of a single control variable of a phase shift angle α between switching in a first leg of the active bridge section 202 and a second leg in the active bridge section 202, as described below.

To appreciate advantages of the SRC 400 described above, the SRC 400 is analyzed using steady state analysis.

The steady state analysis is presented for the SRC 400 with a constant current input $I_g$, as shown by the circuit topology in FIG. 4, is based on a fundamental approximation, which assumes that power transferred from input to output is mostly carried by the fundamental components of the SRC 400. As illustrated in FIG. 4, for the topology analyzed, the input is a constant current source, the SRC active bridge section 202 includes four MOSFETs Q1-Q4, the resonant section 204 includes the resonant inductor $L_r$ and capacitor $C_r$, and the output rectifier 206 is a diode half-bridge voltage doubler that includes diodes $D_1$ and $D_2$. In addition, the 1:n power transformer $T_r$ provides voltage conversion and isolation between input and output. In some embodiments, phase-shift modulation is employed as a driving scheme, with the definition of the phase shift angle α illustrated in FIG. 5.

Figure 5:
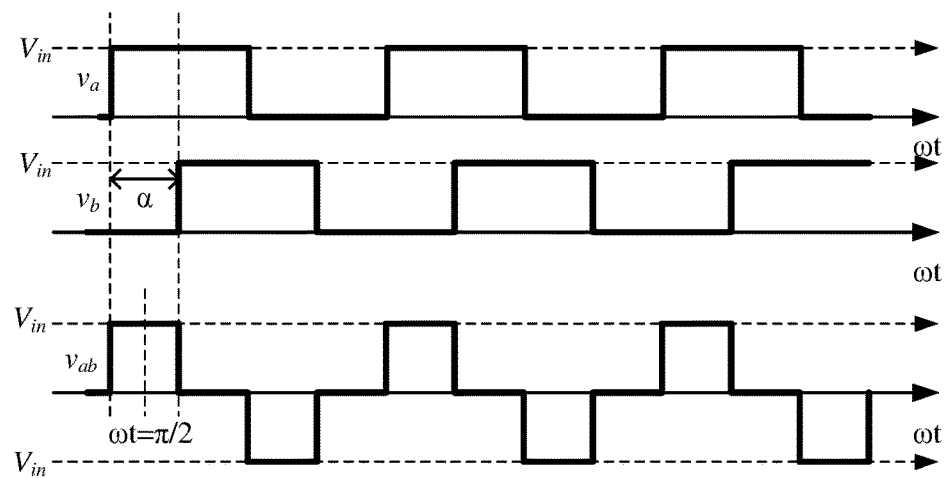
FIG. 5 is an ideal waveform diagram demonstrating a phase shift angle.
Figure 6:
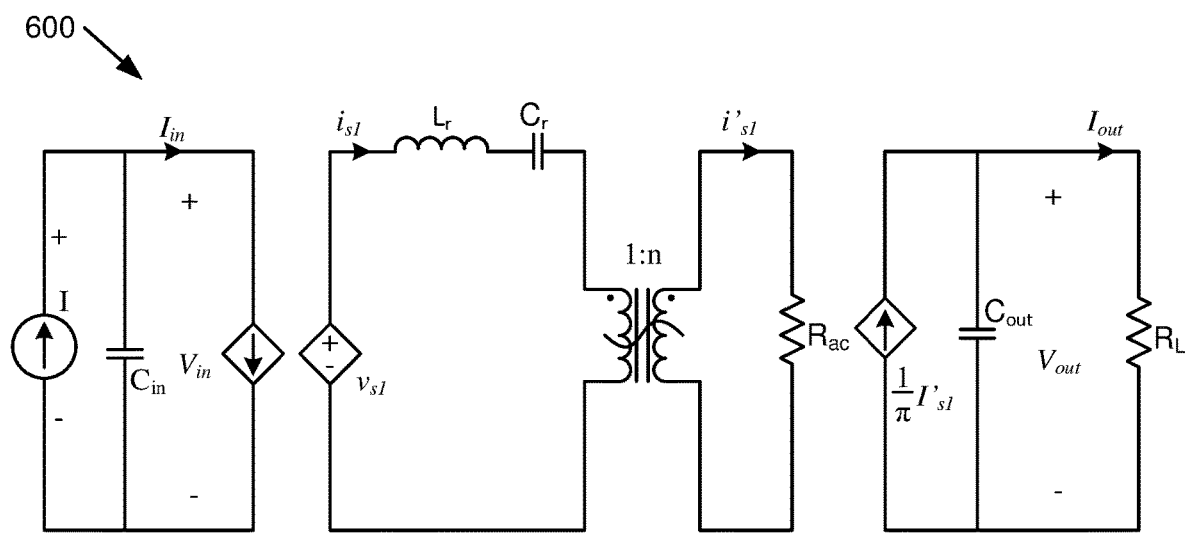
FIG. 6 is a schematic block diagram illustrating an equivalent circuit diagram of the SRC topology.

FIG. 5 is an ideal waveform diagram demonstrating a phase shift angle α. The top waveform is the voltage at connection point A ($v_a$), the voltage at connection point B ($v_b$) and the voltage across the connection points $v_{ab}$. The phase shift angle α is a difference between $v_a$ and $v_b$, which is used to control an amount of energy transferred from the source $I_g$ to the load $R_{load}$. FIG. 6 is a schematic block diagram illustrating an equivalent circuit diagram 600 of the SRC topology. The equivalent circuit diagram 600 includes a constant current source with current I and an input capacitor $C_{in}$ where input current $I_{in}$ is measured after the input capacitor $C_{in}$.

By applying the fundamental approximation and average approximation, the equivalent circuit of the SRC topology described herein can be derived as shown in FIG. 6. The equivalent resistor $R_{ac}$, the input current $I_{in}$ and the controlled voltage source vs1 are expressed as:

$$R_{ac} = \frac{2}{\pi^2} R_L \tag{1}$$

$$I_{in} = \frac{2I_{s1}}{\pi} \sin\left(\frac{\alpha}{2}\right) \cos(\varphi_s) \tag{2}$$

$$v_{s1} = \frac{4}{\pi} V_{in} \sin\left(\frac{\alpha}{2}\right) \sin(\omega_s t) \tag{3}$$

In equations (1-3), $R_L$ is the load resistance, $\varphi_s$ is the phase shift of $i_{s1}$ with respect to $v_{s1}$, $I_{s1}$ is the peak value of $i_{s1}$, and α is the input bridge phase shift angle, which ranges from 0° to 180°.

The resonant frequency, normalized switching frequency, characteristic impedance $Z_o$ and the loaded quality factor Q of the resonant section 204 are defined as:

$$\omega_o = \frac{1}{\sqrt{LC}} \tag{4}$$

$$F = \frac{f_s}{f_o} = \frac{\omega_s}{\omega_o} \tag{5}$$

$$Z_o = \sqrt{\frac{L}{C}} = \omega_o L = \frac{1}{\omega_o C} \tag{6}$$

$$Q = \frac{n^2 Z_o}{R_{ac}} = \frac{n^2 \pi^2 Z_o}{2 R_L} = \frac{n^2 \pi^2 \omega_o L}{2 R_L} \tag{7}$$

Note that the input voltage $V_{in}$ is not constant in the equivalent circuit show in FIG. 6. The input voltage $V_{in}$ is determined by the constant input current I, phase shift angle α and load $R_L$. For a lossless power converter, the output power is equal to the input power, which can be used to derive the input voltage expression. The input voltage can be expressed as:

$$V_{in} = \frac{IR_L}{4n^2 \sin^2\left(\frac{\alpha}{2}\right)} \left(1 + Q^2 \left(F - \frac{1}{F}\right)^2\right) \tag{8}$$

Based on equation (8) and the equivalent circuit illustrated in FIG. 6, the output current $I_{out}$, output voltage $V_{out}$ and output power $P_{out}$ of an SRC 400 with constant input current I can be expressed in forms of normalized switching frequency F and the resonant tank quality factor Q as:

$$I_{out} = \frac{1}{2n\sin\left(\frac{\alpha}{2}\right)} \sqrt{1 + Q^2\left(F - \frac{1}{F}\right)^2} \tag{9}$$

$$V_{out} = \frac{IR_L}{2n\sin\left(\frac{\alpha}{2}\right)} \sqrt{1 + Q^2\left(F - \frac{1}{F}\right)^2} \tag{10}$$

$$P_{out} = \frac{I^2 R_L}{4n^2 \sin^2\left(\frac{\alpha}{2}\right)} \left(1 + Q^2\left(F - \frac{1}{F}\right)^2\right) \tag{11}$$

Equations (8)-(11) are the steady state solutions for an SRC 400 with constant current input. From the steady state solutions, it can be seen that the SRC 400 with constant current input behaves quite differently from the constant voltage input case.

The current gain of the SRC 400 can be written as:

$$M_I = \frac{I_{out}}{I} \tag{12}$$

Substituting equation (9) into equation (12), the current gain can be written as:

$$M_I = \frac{\sqrt{1 + Q^2\left(F - \frac{1}{F}\right)^2}}{2n\sin\left(\frac{\alpha}{2}\right)} \tag{13}$$

From equation (13), the current gain $M_I$ is a function of quality factor Q, normalized switching frequency F, transformer turns ratio n and the phase shift angle α. By close examination of equation (13), the current gain $M_I$ becomes independent of Q (load) if the normalized switching F is equal to 1. When F is equal to 1, $M_I$ can be expressed as:

$$M_I = \frac{I_{out}}{I} = \frac{1}{2n\sin\left(\frac{\alpha}{2}\right)} \tag{14}$$

From equation (14), the current gain $M_I$ of the SRC 400 with constant current input only depends on the transformer turns ratio n and the SRC 400 input bridge phase shift angle α, and is independent of the load resistance $R_L$, which means the SRC 400 has a current source output behavior. From equation (14), for the SRC 400 with constant current input I, maximum phase shift (180°) results in minimum current gain $M_{I\_min}$, while lower phase shift angle leads to a higher current gain. When the phase shift angle α equals to 180°, the minimum current gain $M_{I\_min}$ can be expressed as:

$$M_{I\_min} = \frac{I_{out}}{I} = \frac{1}{2n} \quad (15)$$

Figure 7:
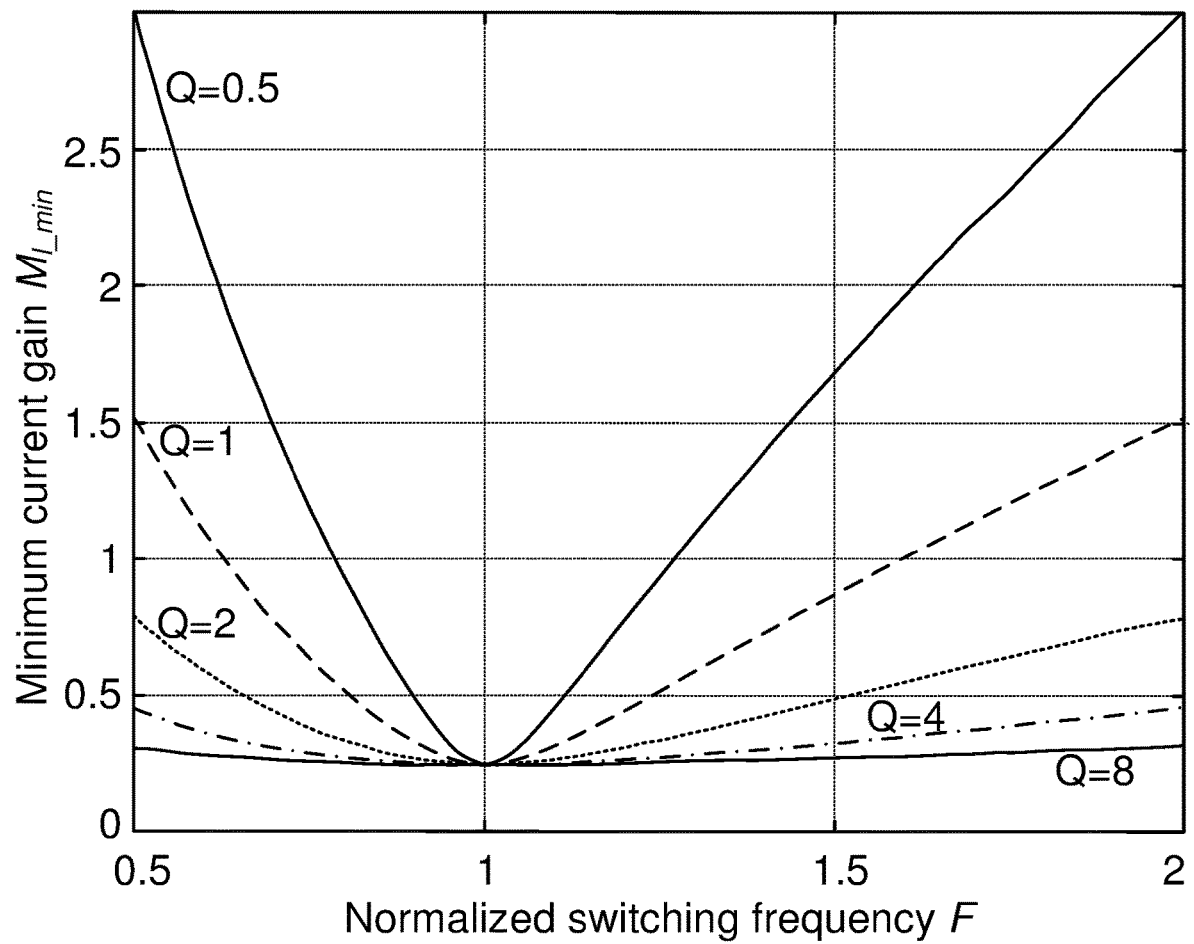
FIG. 7 is a waveform diagram demonstrating minimum converter gain $M_{I\_min}$ versus normalized switching frequency F for different quality factor Q values with a transformer turns ratio of n=2.

From equation (15), the minimum current gain $M_{I\_min}$ of the SRC 400 with a constant current input I is determined by the transformer turns ratio n. As a result, the transformer turns ratio n, in some embodiments, is designed so that the minimum current gain $M_{I\_min}$ is lower than an objective, considering input current variation. As an example, the plots of minimum current gain $M_{I\_min}$ versus the normalized switching frequency F are illustrated in FIG. 7 for different Q values with transformer turns ratio n=2.

With regard to component stress analysis and design considerations, the root-mean-square ("rms") value of the resonant inductor current and resonant capacitor voltage can be expressed as:

$$I_{L,rms} = \frac{\pi I}{2\sqrt{2} \sin(\frac{\alpha}{2})} \sqrt{1 + Q^2 \left(F - \frac{1}{F}\right)^2} \quad (16)$$

$$V_{C,rms} = \frac{\pi Z_o I}{2\sqrt{2} \, F \sin(\frac{\alpha}{2})} \sqrt{1 + Q^2 \left(F - \frac{1}{F}\right)^2} \quad (17)$$

As analyzed in above, the normalized switching frequency F is chosen to be one in order to obtain current source behavior at the output of the SRC 400 with constant current input I. As a result, the rms current of the resonant inductor $L_r$ and voltage of the resonant capacitor $C_r$ are independent from the load as well, which can be written as:

$$I_{L,rms} = \frac{\pi I}{2\sqrt{2} \sin(\frac{\alpha}{2})} \quad (18)$$

$$V_{C,rms} = \frac{\pi Z_o I}{2\sqrt{2} \sin(\frac{\alpha}{2})} \quad (19)$$

From equation (18), the rms current of the resonant inductor $L_r$ only depends on DC input current I and the phase shift angle α. From equation (14), for a given current gain, the required phase shift angle α is determined by the transformer turns ratio n. So, the rms current of the resonant inductor is determined by the DC input current I and transformer turns ratio n for a given current gain. Since the resonant inductor rms current is independent from the load as well, it should be constant for the entire load range for a given design and DC input current I.

Equation (19) shows that the rms voltage of the resonant capacitor Cr depends on the characteristic impedance $Z_o$ of the resonant section 204, the input current I and the phase shift angle α. By looking at equations (18) and (19) carefully, the rms voltage of the resonant capacitor $C_r$ is the rms current of the resonant inductor $I_{L,rms}$ multiplied by the characteristic impedance $Z_o$. Similar to the rms current of the resonant inductor $I_{L,rms}$, the resonant capacitor rms voltage should be constant for the entire load range for a given design.

For a given application scenario, the SRC 400 with constant current input I and regulated output current $I_{out}$ can be designed by applying equations (14), (18) and (19). The design procedure, in some embodiments, is summarized as follows:

1. Calculate the possible current gain range based on the given input current range and desired output current.
2. Determine the transformer turns ratio n based on the minimum current gain $M_{I\_min}$ and equation (15) with the considerations of design margin and losses. Lower phase shift angle α means higher rms resonant inductor current, which means higher losses, so, in one embodiment, a proper margin is included in order to obtain higher efficiency.
3. Substituting equation (15) into equations (18) and (19), the rms values of the resonant inductor current and the resonant capacitor voltage are expressed as:

$$I_{L,rms} = \frac{n\pi I_{out}}{\sqrt{2}} \quad (20)$$

$$V_{C,rms} = \frac{nm Z_o I_{out}}{\sqrt{2}}. \quad (21)$$

4. From equation (20), the resonant inductor rms current is determined once the transformer turns ratio n is selected.
5. Based on a desired voltage stress on the resonant capacitor $C_r$, the designed transformer turns ratio n, the desired output current $I_{out}$ and equation (21), the characteristic impedance $Z_o$ of the resonant tank can be calculated.
6. The desired operating frequency of the SRC 400 generally is a known parameter for a design scenario. Based on the calculated characteristic impedance $Z_o$, a desired switching frequency and equation (6), the value of either resonant inductor or resonant capacitor can be determined.
7. Based on the result from step 6 and equation (4), a value of the other resonant component can be calculated.

For the design of an SRC 400 with constant current input I and regulated output current $I_{out}$, the minimum quality factor Q of the resonant tank is at full load. Lower voltage stress on the resonant capacitor $C_r$ typically means lower characteristic impedance $Z_o$, which results in lower quality factor Q at full load. Lower quality factor Q means higher harmonic components in the SRC 400, which is not desired.

However, higher quality factor Q means lower resonant capacitance $C_r$ for a given switching frequency. In practice, the transformer $T_r$ used in the SRC 400 has a parasitic capacitance, especially for a high frequency, high isolation voltage transformer. In this case, high quality factor Q at full load may result in a condition that the transformer parasitic capacitance is comparable to the resonant capacitance, which is also not desirable. So, an SRC 400 with constant current input and regulated output current, in some embodiments, is designed according to the analysis and procedure presented herein along with other considerations such as load range and parasitic parameters of the employed transformer $T_r$.

As discussed above, the SRC 400 with constant input current I behaves as a current source only when the SRC 400 operates at resonant frequency $f_o$, so switching frequency control is not employed to control the output, otherwise the current source behavior will be lost. In addition, FIG. 7 indicates that the current gain $M_I$ is relatively flat for low quality factor Q in the vicinity of F=1. In addition, the quality factor Q is lower when the load resistance becomes higher. As a result, variation of switching frequency does not provide wide conversion range and output current regulation against large input current variations. Thus, constant frequency control has advantage. From equation (14), it can be seen that the current gain $M_I$ can be controlled by the phase shift angle α of the active bridge section 202, so phase shift modulation control can be applied to the SRC 400 with constant input current I.

If the circuit of SRC 400 with constant current input shown in FIG. 4 is directly employed as the DC-DC converters 102 in FIG. 1, the entire system 100 has operational issues because the MOSFETs in the primary bridge are typically enhancement type MOSFETs which are normally open. Since the DC-DC converters 102 are connected in series, as shown in FIG. 1, open state of the MOSFETs means that the main trunk cable is open. One solution would be to provide an auxiliary supply separate from the trunk cable to supply power to the MOSFETs. However, in such a long distance, DC current distribution system for undersea and other applications, this solution is impractical with the consideration of cost, voltage drop and system reliability. Hence, auxiliary power for the DC-DC converters 102, in some embodiments, is provided by the trunk cable, which requires a continuous current flow through the trunk cable in order to deliver auxiliary power to the DC-DC converters 102. In this case, a closed circuit path for the trunk cable current is desirable at startup.

The SRC 400 in FIG. 4 includes a bypass branch 404 connected in parallel with the input terminals where the bypass branch 404 shunts current I from the constant current source through the bypass branch 404 when the bypass branch 404 is active. In some embodiments, the bypass branch 404 includes a sensing resistor $r_s$ in series with a shunt switch Q5 that is a transistor, such as a MOSFET. The controller 402 operates the shunt switch Q5 in an active region of the transistor to shunt current I from the constant current source in a range between zero current and a full current of the constant current source where the shunt switch Q5 is operable to shunt a portion of the current I of the constant current source.

In the SRC 400 of FIG. 4, the MOSFET Q5 is a depletion type MOSFET and $r_s$ is the current sensing resistor in that branch. This bypass branch 404 in the SRC 400, which is switch Q5 in series with $r_s$ and the submarine cable in the system 100 provide a continuous path for the main trunk current even before any SRC 400 in the system 100 is energized. The depletion type MOSFET Q5, in some embodiments, is selected to be capable of handling power dissipation during start-up and shut-down of SRC 400.

In some embodiments, a three-step startup and shutdown technique is proposed for system operations. For the startup, a first step is to turn on the shore power supply 104 and provide the desired distribution current to the rest of the system 100, which is used to power all the auxiliary power supplies of each DC-DC converter 102 (e.g. SRC 400). When the auxiliary power supply 104 is on, a certain amount of time delay is employed before taking the next action in order to ensure that all the auxiliary power supplies in the system 100 are turned on.

A second step is to pass the trunk current from the bypass branch 404 to the input of the SRC 400. In this step, the SRC 400 operates at 180° phase shift in open loop mode, which provides minimum output current $I_{out}$ to the load $R_L$. A bypass branch current controller in the controller 402 ramps down the current flow through the bypass branch 404 from full trunk current to zero. The ramp time and the load of the SRC 400 at 180° phase shift determines how much energy is dissipated in the bypass branch 404 during the start-up. The SRCs 400 in the system 100 can do this at the same time or in a sequence. The second step is completed once the full trunk current flows through the SRC 400 instead of the bypass branch 404.

The third step is to enable the SRC 400 to start regulating its output current $I_{out}$ and to close a feedback control loop of the SRC 400. For the shut-down, the scenario is similar. The first step is to open the SRC feedback regulation, and then take the full trunk current from SRC input to the bypass branch 404 with a ramp by changing the current reference of the bypass branch current controller. The last step is to turn off the auxiliary power supplies of the SRCs 400 and then the shore power supply 104.

In some embodiments, the SRC 400 includes a resonant capacitor voltage clamping circuit 406 that clamps voltage across the resonant capacitor $C_r$ to a voltage less than a maximum voltage rating of the resonant capacitor $C_r$ during a transient condition, such as an output short circuit condition where energy from the resonant capacitor $C_r$ may be transferred to the output.

Figure 8:
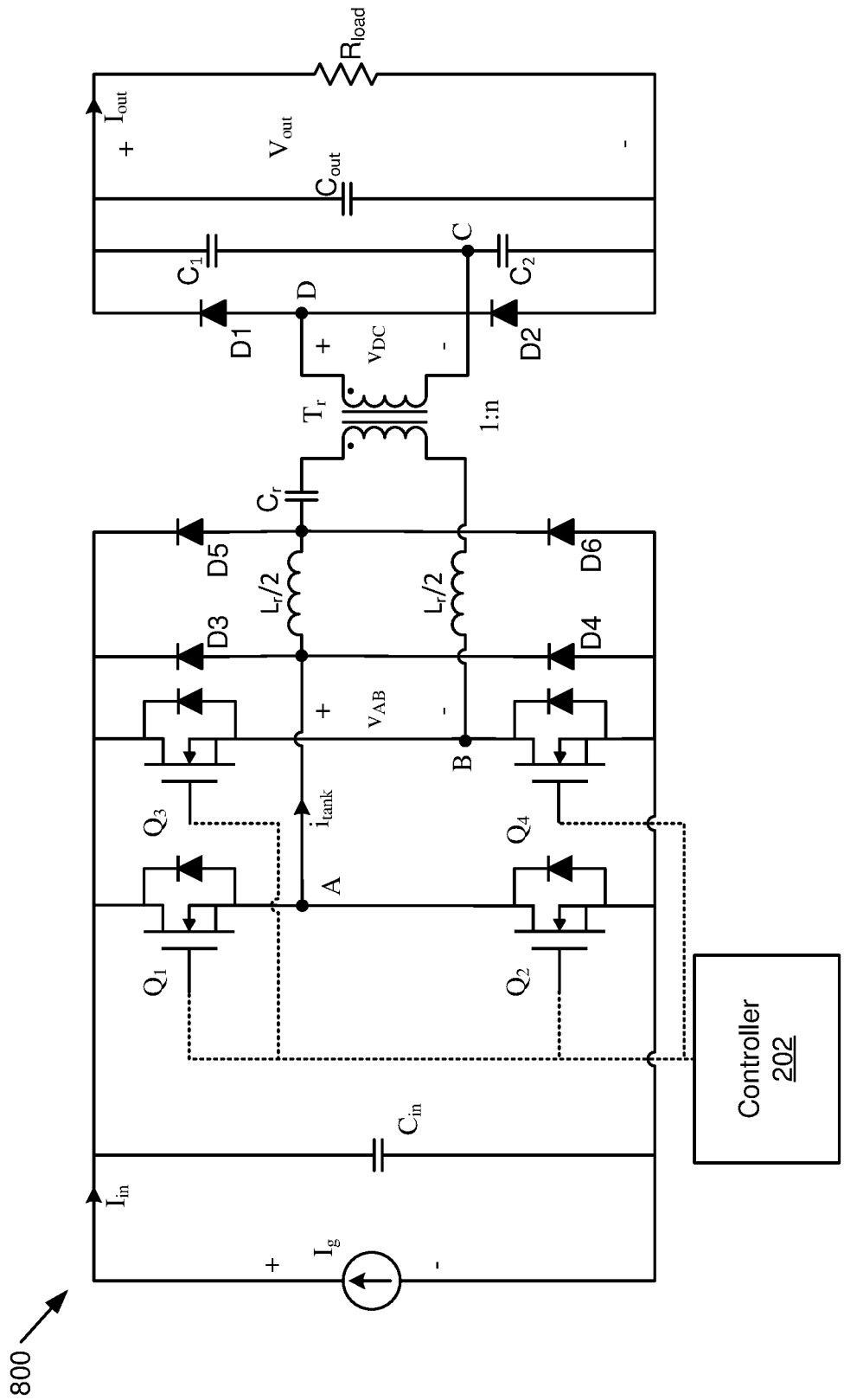
FIG. 8 is a schematic block diagram illustrating one embodiment of a SRC with a full-bridge switching section and that regulates output current and is fed by a constant current source and includes another embodiment of a resonant capacitor voltage clipping circuit.

An SRC 400 with one embodiment of a resonant capacitor voltage clamping circuit 406 to protect the SRC 400 during fault transients is depicted in FIG. 8. In FIG. 8, the diodes $D_3$, $D_4$, $D_5$ and $D_6$ are used to clamp the voltage of the resonant capacitor $C_r$ to the input voltage $V_{in}$. However, by analyzing the voltage of resonant capacitor terminals to ground, the capacitor terminal voltages are expressed as $V_{in} \pm 0.5 v_{Cr}$ when Q1 and Q3 are on, which is a general case for phase shift modulation control. In this embodiment, for phase shift modulation controlled SRC 400, circulating currents between the resonant section 204 and the input filter are unavoidable. On the other hand, for the SRC 400 with constant current input, the voltage across the resonant capacitor $C_r$ is higher than the input voltage $V_{in}$ for certain load ranges, which means that the protection approach shown in FIG. 8 may not be desirable in some embodiments because the resonant capacitor voltage clamping circuit of FIG. 8 alters steady state operation.

In some embodiments, the SRC 400 of FIG. 4 includes a resonant capacitor voltage clamping circuit 406 with a diode full-bridge rectifier, with diodes $D_3$, $D_4$, $D_5$ and $D_6$, with an input of the diode full-bridge rectifier connected across the resonant capacitor $C_r$ and an output of the diode full-bridge rectifier connected in parallel with a clamping capacitor $C_c$ and connected in parallel with a bleeder resistor $r_c$, where during steady-state operation voltage across the clamping capacitor $C_c$ is higher than a voltage rating of the resonant capacitor $C_r$.

The resonant capacitor voltage clamping circuit 406 of FIG. 4 clamps the resonant capacitor voltage to the voltage of the floating clamping capacitor $C_c$, which holds a peak voltage across the resonant capacitor $C_r$ regardless of the relation between the resonant capacitor voltage and the input voltage $V_{in}$. The bleed resistor $R_c$ is in parallel with the clamping capacitor $C_c$ and has a large enough value to not significantly affect efficiency, but will discharge the clamping capacitor $C_c$ when the SRC 400 is not operating. During steady state, since the clamping capacitor $C_c$ holds the resonant capacitor peak voltage, no significant current flows through the clamping diodes $D_3$-$D_6$ except for a small current to feed the bleed resistor $R_c$.

For the SRC 400 without a protection circuit, energy stored in the input capacitor $C_{in}$ is transferred to the resonant section 204 during an output short circuit fault transient. With the resonant capacitor voltage clamping circuit 406 shown in FIG. 4, energy stored in the input capacitor $C_{in}$ is transferred to the resonant section 204 and the clamping capacitor $C_c$. In this case, during fault transients, voltage across the resonant capacitor $C_r$ can be limited to protect the SRC 400.

The energy stored on a capacitor is calculated from:

$$E = \tfrac{1}{2}CV^2 \tag{22}$$

Hence the energy stored in the capacitors $C_{in}$, $C_r$, $C_c$ of the SRC 400 before a fault can be expressed as:

$$E_{C_{in}} = \tfrac{1}{2}C_{in}V_{in}^2,\ E_{C_r} = \tfrac{1}{2}C_rV_r^2,\ E_{C_c} = \tfrac{1}{2}C_cV_c^2 \tag{23}$$

where $V_{in}$ is the DC input voltage, $V_{C_r}$ is the peak voltage of the resonant capacitor $C_r$, and $V_C$ is the peak voltage of the clamping capacitor $C_c$, which equals to $V_{C_r}$.

From the equations of (23), the total energy stored on the resonant capacitor $C_r$ and the clamping capacitor $C_c$ is:

$$E_{C_r} + E_{C_c} = \tfrac{1}{2}(C_r + C_c)V_{C_r}^2 \tag{24}$$

During an output short circuit fault transient, the energy stored in the input capacitor $C_{in}$ is transferred to the resonant section 204 and the clamping capacitor $C_c$. Hence, the total energy $E_{total}$ stored on $C_r$ and $C_c$ becomes:

$$E_{total} = E_{C_r} + E_{C_c} + E_{C_{in}} = \tfrac{1}{2}(C_r + C_c)V_{C_r}^2 + \tfrac{1}{2}C_{in}V_{in}^2 \tag{25}$$

With the energy transferred from the input capacitor $C_{in}$, the voltage across the resonant capacitor $C_r$ and clamping capacitor $C_c$ increases by:

$$\Delta V = \sqrt{V_{C_r}^2 + \frac{C_{in}V_{in}^2}{C_r + C_c}} - V_{C_r} \tag{26}$$

From equation (26), the clamping capacitor $C_c$ required for limiting the voltage across the resonant capacitor $C_r$ to a certain voltage increment $\Delta V$ can be derived as:

$$C = \frac{C_{in}V_{in}^2}{(C_{C_r} + \Delta V)^2 - V_{C_r}^2} - C_r \tag{27}$$

For output short-circuit fault, the resulting large surge output current may damage the current sensing circuit if resistive current sensing is employed. From reliability aspect, it is preferred to have an output current limiting circuit for protection, especially for low output current, high output voltage applications. The proposed output current limiting circuit 408 in FIG. 4. In FIG. 4, switch Q6 is a depletion type MOSFET and r1 is a feedback resistor. As shown in FIG. 4, the negative voltage from r1 is applied to the gate terminal of switch Q6 to control the equivalent resistance presented by switch Q6, since switch Q6 operates in the linear region. The proposed current limiting circuit 408 does not require any active drive or auxiliary circuits. The current limiting circuit does introduce additional power loss during normal operation because of the low output current that flows the high on-resistance of the depletion type MOSFET. In one embodiment of an SRC 400 used for experimentation, the current limiting circuit 408 introduces an additional 20Ω resistance that consumes 2 W during normal operation, which is negligible compared with 1 kW output power.

For the DC current distribution system 100, the SRC 400 that has a fault should to be bypassed in order to keep the rest of the system 100 operating. Capacitance of the submarine cable, in some embodiments, is significantly high due to its parameters and length. Since the DC-DC converters 102 (e.g. SRCs 400) are connected in series, bypass of one module means discharging the cable capacitance in its forward current path. In this case, uncontrolled cable discharging may result in large current through other SRC 400 in the system 100, and finally cause the entire system 100 shutdown. To help provide normal operation of the complete system 100, a two-level fault response strategy is proposed. The first level is to disable the gate signals of the primary switches Q1-Q4, and the second level is to use the bypass branch 404 to control the discharging of the cable to make sure that the distribution current stay within the range.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power supply comprising:
an active bridge section with input terminals that receive power from a constant current source, wherein the active bridge section operates at a fixed switching frequency;
a resonant section comprising a resonant inductor and a resonant capacitor, the resonant section connected to an output of the active bridge section;
an output rectifier that receives power from the resonant section and comprising output terminals for connection to a load; and
a controller that regulates output current to the load, wherein the controller regulates output current to the load by controlling switching of the active bridge section,
wherein the fixed switching frequency of the active bridge section matches a resonant frequency of the resonant section, and
wherein the controller regulates output current to the load as a function of current gain from the output current to current from the constant current source by controlling switching of the active bridge section as a single control variable over a range from a minimum load condition to a full load condition.

2. The power supply of claim 1, wherein the active bridge section comprises a full active bridge, the output rectifier comprises a diode half-bridge voltage doubler and further comprising a transformer between the resonant section and the output rectifier, wherein the controller regulates the current gain as a function of a single control variable of a phase shift angle between switching in a first leg of the active bridge section and a second leg in the active bridge section.

3. The power supply of claim 2, wherein the controller regulates the current gain according to the equation:

$$M_I = \frac{I_{out}}{I} = \frac{1}{2n\sin\left(\frac{\alpha}{2}\right)}$$

where:

$M_I$ is the current gain;

$I_{out}$ is the output current;

I is the current from the constant current source;

n is a turns ratio of the transformer; and

α is the phase shift angle.

4. The power supply of claim 1, wherein the active bridge section comprises a half-bridge and wherein the controller regulates the current gain as a function of a single control variable of a duty cycle of switches of the active bridge section.

5. The power supply of claim 1, further comprising a bypass branch connected in parallel with the input terminals, wherein the bypass branch shunts current from the constant current source through the bypass branch when the bypass branch is active.

6. The power supply of claim 5, wherein the bypass branch comprises a sensing resistor in series with a shunt switch comprising a transistor, wherein the controller operates the shunt switch in an active region of the transistor to shunt current from the constant current source in a range between zero current and a full current of the constant current source, wherein the shunt switch is operable to shunt a portion of the current of the constant current source.

7. The power supply of claim 1, further comprising a resonant capacitor voltage clamping circuit that clamps voltage across the resonant capacitor to a voltage less than a maximum voltage rating of the resonant capacitor during a transient condition.

8. The power supply of claim 7, wherein the resonant capacitor voltage clamping circuit comprises a diode full-bridge rectifier with an input of the diode full-bridge rectifier connected across the resonant capacitor and an output of the diode full-bridge rectifier connected in parallel with a clamping capacitor and connected in parallel with a bleeder resistor, wherein during steady-state operation, voltage across the clamping capacitor is higher than a voltage rating of the resonant capacitor.

9. The power supply of claim 1, further comprising a current limiting circuit connected in series between an output terminal of the output rectifier and the load, wherein the current limiting circuit increases a resistance across the current limiting circuit in response to output current to the load increasing above an output current limit.

10. The power supply of claim 9, wherein the current limiting circuit comprises a current limiting switch in series with a sensing resistor, the current limiting switch comprising a transistor, wherein voltage across the sensing resistor is connected to a control terminal of the transistor and wherein a voltage level across the sensing resistor activates an active region of the transistor and wherein a current increase in the sensing resistor increases a resistance across the transistor.

11. A power supply comprising:

an active bridge section with input terminals that receive power from a constant current source;

a resonant section comprising a resonant inductor and a resonant capacitor, the resonant section connected to an output of the active bridge section;

an output rectifier that receives power from the resonant section and comprising output terminals for connection to a load;

a controller that regulates output current to the load;

a bypass branch connected in parallel with the input terminals, wherein the bypass branch shunts current from the constant current source through the bypass branch when the bypass branch is active;

a resonant capacitor voltage clamping circuit that clamps voltage across the resonant capacitor to a voltage less than a maximum voltage rating of the resonant capacitor during a transient condition; and a current limiting circuit connected in series between an output terminal of the output rectifier and the load, wherein the current limiting circuit increases a resistance across the current limiting circuit in response to output current to the load increasing above an output current limit, wherein the active bridge section operates at a fixed switching frequency, wherein the controller regulates output current to the load by controlling switching of the active bridge section, and wherein the fixed switching frequency of the active bridge section matches a resonant frequency of the resonant section, and wherein the controller regulates output current to the load as a function of current gain from the output current to current from the constant current source by controlling switching of the active bridge section as a single control variable over a range from a minimum load condition to a full load condition.

12. The power supply of claim 11, wherein the active bridge section comprises a full active bridge, the output rectifier comprises a diode half-bridge voltage doubler and further comprising a transformer between the resonant section and the output rectifier, wherein the controller regulates the current gain as a function of a single control variable of a phase shift angle between switching in a first leg of the active bridge section and a second leg in the active bridge section.

13. The power supply of claim 11, wherein the bypass branch comprises a sensing resistor in series with a shunt switch comprising a transistor, wherein the controller operates the shunt switch in an active region of the transistor to shunt current from the constant current source in a range between zero current and a full current of the constant current source, wherein the shunt switch is operable to shunt a portion of the current of the constant current source.

14. The power supply of claim 11, wherein the resonant capacitor voltage clamping circuit comprises a diode full-bridge rectifier with an input of the diode full-bridge rectifier connected across the resonant capacitor and an output of the diode full-bridge rectifier connected in parallel with a clamping capacitor and connected in parallel with a bleeder resistor, wherein during steady-state operation voltage across the clamping capacitor is higher than a voltage rating of the resonant capacitor.

15. The power supply of claim 11, wherein the current limiting circuit comprises a current limiting switch in series with a sensing resistor, the current limiting switch comprising a transistor, wherein voltage across the sensing resistor is connected to a control terminal of the transistor and wherein a voltage level across the sensing resistor activates an active region of the transistor and wherein a current increase in the sensing resistor increases a resistance across the transistor.

16. A controller comprising:

an output current regulation feedback loop that regulates output current of a power supply to a load, wherein the controller regulates output current to the load by controlling switching of an active bridge section of the power supply, the power supply comprising:

a resonant section comprising a resonant inductor and a resonant capacitor, the resonant section connected to an output of the active bridge section, the active bridge section comprising input terminals that receive power from to a constant current source, wherein the active bridge section operates at a fixed switching frequency; and an output rectifier that receives power from the resonant section and comprising output terminals for connection to the load, wherein the fixed switching frequency of the active bridge section matches a resonant frequency of the resonant section, and wherein the controller regulates output current to the load as a function of current gain from the output current to current from the constant current source by controlling switching of the active bridge section as a single control variable over a range from a minimum load condition to a full load condition.

17. The power supply of claim 16, further comprising:

a bypass branch connected in parallel with the input terminals, wherein the bypass branch shunts current from the constant current source through the bypass branch when the bypass branch is active;

a resonant capacitor voltage clamping circuit that clamps voltage across the resonant capacitor to a voltage less than a maximum voltage rating of the resonant capacitor during a transient condition; and a current limiting circuit connected in series between an output terminal of the output rectifier and the load, wherein the current limiting circuit increases a resistance across the current limiting circuit in response to output current to the load increasing above an output current limit.

* * * * *